United States Patent [19]

Nakamura et al.

[11] Patent Number: 4,762,568
[45] Date of Patent: Aug. 9, 1988

[54] PIGMENT COMPOSITION

[75] Inventors: Michiei Nakamura, Soka; Hitoshi Takeuchi, Showa; Tetsujiro Takahashi, Koshigaya; Yoshitake Kori, Ageo; Minoru Takizawa, Koshigaya; Takamitsu Shinoda, Kashiwa; Shojiro Horiguchi, Omiya, all of Japan

[73] Assignee: Dainichiseika Color & Chemicals Mfg. Co., Ltd., Tokyo, Japan

[21] Appl. No.: 84,197

[22] Filed: Aug. 12, 1987

[30] Foreign Application Priority Data

Aug. 20, 1986 [JP] Japan .................. 61-192919

[51] Int. Cl.$^4$ .............................................. C09C 3/00
[52] U.S. Cl. ...................... 106/403; 106/23; 106/404; 106/432; 106/413; 106/447; 106/453; 106/460; 106/465; 106/471; 106/491; 106/493; 106/496; 106/497; 106/498; 106/503
[58] Field of Search ............... 106/23, 308 M, 308 Q; 524/599, 600, 601, 604, 605

[56] References Cited

U.S. PATENT DOCUMENTS 4,698,099 10/1987 Nakamura et al. ............. 106/308 Q
4,704,165 11/1987 Nakamura et al. ............. 106/308 Q Primary Examiner—Paul Lieberman
Assistant Examiner—Helene Kirschner
Attorney, Agent, or Firm—Oblon, Fisher, Spivak, McClelland & Maier

[57] ABSTRACT

A pigment composition contains a pigment and a dispersant. The dispersant is a phosphoric ester compound represented by the following general formula:

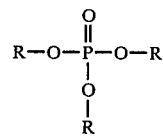

wherein at least one of the three Rs is a residuum of a polyester chain containing as principal bonds thereof ester bonds of a polycarboxylic acid and a polyalcohol.

3 Claims, No Drawings

PIGMENT COMPOSITION

BACKGROUND OF THE INVENTION (1) Field of the Invention

This invention relates to a novel pigment composition, and more specifically to a pigment composition which contains as a pigment dispersant or a flushing agent a phosphoric ester compound containing a polyester chain and is useful as a coloring material such as printing ink, paint or synthetic resin colorant.

(2) Description of the Prior Art

In the production of paints and printing inks, lecithin, a phospholipid, has heretofore been used by way of example as a dispersant or a flushing agent upon dispersing pigments in paint vehicles or printing ink varnishes or upon flushing pigments from aqueous filter cakes into oil vehicles or oil varnishes.

Lecithin is however susceptible to oxidation and rancidity and hence involves a potential problem of property changes or rotting, because it is a phospholipid of natural origin. There is thus an outstanding desire for a dispersant or a flushing agent which has better stability and properties than lecithin.

SUMMARY OF THE INVENTION

An object of this invention is therefore to provide a pigment composition free from the abovedescribed problems of pigment compositions which make use of lecithin or the like as a dispersant or a flushing agent.

In view of the above-described drawbacks of conventional pigment dispersants or flushing agents, the present inventors have carried out a wide variety of investigation with a view toward developing a compound which is compatible not only with various vehicles and varnishes but also with pigments. As a result, it has been found that a phosphoric ester compound having a polyester chain exhibits excellent properties and effects as a dispersant for pigments, leading to completion of this invention.

In one aspect of this invention, there is thus provided a pigment composition containing a pigment and a dispersant, characterized in that said dispersant is a phosphoric ester compound represented by the following general formula:

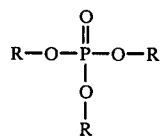

wherein at least one of the three Rs is a residuum of a polyester chain containing as principal bonds thereof ester bonds of a polycarboxylic acid and a polyalcohol.

The phosphoric ester compound, which is useful in the present invention and contains a polyester chain bonded thereto, is free from the danger of property changes and rotting due to oxidation and/or rancidity such as those observed conventionally from the use of lecithin, a phospholipid of natural origin, as a dispersant for pigments in the field of coloring materials such as paints, printing inks and plastic colorants. The phosphoric ester compound has excellent stability and shows superb effects, for example, in modifying pigment surfaces or dispersing pigments in media.

Owing to properties such as electron attracting property of the phosphoric ester bond and ester bond and compatibility of the hydrocarbon chain with media, the phosphoric ester compound which is useful in the present invention and contains a polyester chain bonded thereto is adsorbed on the surface of a pigment to improve wetting properties of the pigment to a medium, whereby the dispersibility of the pigment in the medium is improved and the resulting dispersion has good flowability. The phosphoric ester compound also renders the surface of a pigment lipophilic or hydrophobic when employed as a flushing agent upon flushing an aqueous filter cake of the pigment, so that the pigment can be flushed easily and efficiently.

Furthermore, the above-described phosphoric ester compound, in which a residuum of an aromatic hydrocarbon, alicyclic hydrocarbon or heterocyclic compound—a cyclic group having a high carbon number—has been introduced, has high compatibility not only with pigments, especially, organic pigments but also with oil media, so that the dispersibility, flowability, etc. of the pigments in these media are improved further.

The above and other objects, features and advantages of the present invention will become apparent from the following description and the appended claims.

DETAILED DESCRIPTION OF THE INVENTION AND PREFERRED EMBODIMENTS

The present invention will hereinafter be described in detail. The dispersant, which is useful in the practice of this invention and features the present invention primarily, is the specific phosphoric ester compound defined above.

The phosphoric ester compound useful in the practice of this invention can be obtained by various processes. It is however preferable to obtain it by reacting 3, 2 or 1 mole of a hydroxyl-terminated polyester compound with 1 mole of an ester-forming phosphorus compound in accordance with a reaction process which has been known conventionally.

When the hydroxyl-terminated polyester compound is reacted in a proportion of 3 moles per mole of the ester-forming phosphorus compound in the above process, there is obtained a phosphoric ester compound having the above general formula in which the three Rs are individually a group of a polyester chain.

When the hydroxyl-terminated polyester compound is reacted in a proportion of 2 or 1 mole per mole of the ester-forming phosphorus compound in the above process, there is obtained a phosphoric ester compound having the above formula in which one or two of the three Rs are individually a group of a polyester chain. The remaining two or one R is preferably a residuum of a hydroxycarboxylic acid or an alcohol ester thereof, a hydrcarbon group, a hydrogen atom, a cation or the like.

As the ester-forming phosphorus compound, may be employed phosphorus oxychloride, phosphorus pentoxide, phosphorus trichloride, phosphoric anhydride, acetyl phosphate or the like, all of which have been known to date. Of these, phosphorus oxychloride is most preferred.

The above-described reaction between the ester-forming phosphorus compound and hydroxyl-terminated polyester compound may preferably carried out an organic solvent which is inert to these raw materials and the reaction product, is capable of dissolving such raw materials and is used in phosphoric esterification reactions, for example, a saturated aliphatic hydrocarbon such as octane, petroleum ether, ligroin, mineral spirit or kerosine, an aromatic hydrocarbon such as benzene, toluene or xylene, a halogenated aliphatic hydrocarbon such as trichloroethane or tetrachloroethane, or a chlorinated aromatic hydrocarbon such as o-dichlorobenzene or trichlorobenzene.

When a phosphoric halogenide compound such as phosphorus oxychloride is used as an ester-forming phosphorus compound, it is preferable to use as a catalyst, for example, an organic base, e.g., a tertiary amine such as triethylamine, pyridine, 2,6-lutidine or 1,8-diazabicyclo(5,4,0)undecene-7; or an apparent or latent inorganic base such as the oxide, hydroxide, carbonate or organic acid salt of an alkali metal or alkaline earth metal.

Where one or two of the three Rs in the above general formula are individually a hydrogen atom or a cation such as that to be described subsequently, it is only necessary to form a salt by adding a cation source, such as that to be described subsequently, to a reaction mixture after substantial completion of the reaction between the ester-forming phosphorus compound and 1 or 2 moles of the hydroxyl-terminated polyester compound and if necessary (when a phosphoric halide compound is used as the ester-forming phosphorus compound), subsequent to hydrolysis. The addition of such a cation source may be effected before, during or after a pigment composition of this invention is prepared using a phosphoric ester compound of the above general formula in which one or two Rs have individually a residuum of a hydroxyl-terminated polyester compound and the remaining Rs or R is individually a hydrogen ion.

No particular limitation is imposed on the molecular weight of the hydroxyl-terminated polyester compound to be used in the above reaction. Its molecular weight may however range from the molecular weight of a dimer to a polymer having an average molecular weight up to 10,000 with about 500–5,000 being preferred.

Such a hydroxyl-terminated polyester compound can be synthesized by polycondensation of a aliphatic, alicyclic or aromatic polycarboxylic acid and a polyalcohol, which acid and polyalcohol are both raw materials useful for the synthesis of conventionally-known polyesters, and optionally a hydroxycarboxylic acid, and contains hydroxyl groups at terminals.

On the other hand, illustrative examples of usable polycarboxylic acids may include adipic acid, azelaic acid, sebacic acid, hexahydrophthalic anhydride, tetrahydrophthalic anhydride, 3,6-endomethylene-tetrahydrophthalic anhydride ("Nadic Anhydride", trade name), methyl-3,6-endomethylenetetrahydrophthalic anhydride ("Methyl Nadic Anhydride", trade name), hexachloro-endo-methylene-tetrahydrophthalic anhydride ("Het Anhydride", trade name), dodecenyl succinic anhydride, phthalic anhydride, tetrachlorophthalic anhydride, isophthalic acid, terephtalic acid, trimellitic anhydride, pyromellitic anhydride, polymerized rosin, rosin-maleic anhydride addition products, unsaturated fatty acids-maleic anhydride addition products, and so on. As exemplary polyalcohols useful in the practice of this invention, may be mentioned ethylene glycol, di- - poly-ethylene glycols, propylene glycol, di- - poly-propylene glycols, 1,3-butanediol, tetramethylene glycol, neopentyl glycol, hexamethylene glycol, octamethylene glycol, dihydroxymethyl cyclodecane, dihydroxybenzene, tris(hydroxyethyl)isocyanurate, etc.

As hydroxycarboxylic acids which may be used in combination, may be mentioned, for example, ricinoleic acid, 12-hydroxystearic acid, castor oil fatty acid, hydrogenated castor oil fatty acid, $\gamma$-hydroxyvaleric acid, $\epsilon$-hydroxycaproic acid, p-hydroxyethyloxybenzoic acid, etc.

The esterification reaction, in which the above components are used, may be carried out by methods known per se in the art, for example, by choosing preferable reaction conditions, e.g., in a solventless system or in a solvent solution, in the presence of or in the absence of a catalyst, in a reduced or normal pressure system, in air or a nitrogen gas atmosphere.

The phosphoric ester compound obtained in the above-described manner may contain free carboxyl or hydroxyl groups at terminals of the polyester chain. These groups may be esterified with a monoalcohol or monocarboxylic acid, as needed, upon or after synthesis of the starting hydroxy-containing polyester compound or after subsequent conversion into the phosphoric ester compound.

Illustrative examples of the monoalcohol useful for such esterification may include methyl alcohol, ethyl alcohol, propyl alcohol, butyl alcohol, hexyl alcohol, octyl alcohol, dodecyl alcohol, hexadecyl alcohol, octadecyl alcohol, tetracosyl alcohol, hexacosyl alcohol, octadecenyl alcohol, cyclohexyl alcohol, benzyl alcohol and the like. As exemplary monocarboxylic acids, may be mentioned acetic acid, propionic acid, butyric acid, capronic acid, lauric acid, palmitic acid, stearic acid, oleic acid, linoleic acid, linolenic acid, behenic acid, tricyclodecanecarboxylic acid, benzoic acid, rosin, hydrogenated rosin, etc.

Where the phosphoric ester compound of this invention contains a cyclic group having a high carbon number, it exhibits still better properties as a dispersant for pigments.

The term "a cyclic group having a large carbon number" means a residuum of at least two benzene rings coupled together, an aromatic or an alicyclic hydrocarbon group having at least 8 carbon atoms or a heterocyclic ring having at least 8 carbon atoms and embraces, for example, residua derived from diphenylmethane, diphenylethane, diphenylpropane, diphenyl ether, diphenylmethyl ether, diphenyl sulfone, stilbene, biphenyl, naphthalene, fluorene, anthracene, acenaphthene, polyhydronaphthalene, polyhydrophenanthrene, coumarin, quinoline, diphenylene oxide, carbazole, benzcarbazole, etc.

The introduction of these groups into the phosphoric ester compound can be effected by including them in the hydroxyl-terminated polyester compound, a raw material, or by reacting them directly as an alcohol component or phenol component. Reactive compounds for introducing such an aromatic hydrocarbon group, alicyclic hydrocarbon group or heterocyclic group are mono- or poly-alcohols, mono- or poly-phenols, mono- or poly-carboxylic acids and acid chlorides or acid anhydrides thereof, or compounds containing at least two types of groups out of such groups. The following compounds may be mentioned by way of example.

Diphenylmethanecarboxylic acid;
4,4'-Dihydroxydiphenylmethane, 4,4'-dihydroxydiphenylpropane, 4,4'-dioxydiphenylsulfone, and reaction products of these phenols and at least one mole equivalents of epoxy compounds such as ethylene oxide, propylene oxide and eipichlorohydrin;
Diphenylcarboxylic acid;
Diphenyldicarboxylic acid;
Oxybiphenyl, and its reaction products with at least one mole equivalents of epoxy compounds such as ethylene oxide, propylene oxide and epichlorohydrin;
Naphthol, dihydroxynaphthalene, methyl 2-hydroxynaphthoate, and their reaction products with at least one mole equivalents of epoxy compounds such as ethylene oxide, propylene oxide and epichlorohydrin;
Naphthalenecarboxylic acid;
Naphthalenedicarboxylic acids;
3-Hydroxy-anthracene-2-carboxylic acid;
Anthracenecarboxylic acid;
Anthraquinonecarboxylic acid;
Anthraquinonedicarboxylic acid;
Fluorene alcohol;
Fluorenecarboxylic acid;
Phenanthrenecarboxylic acid;
Acenaphthenecarboxylic acid;
Abietic acid;
Di- or tetra-hydroabietic acids;
Polymerized rosin;
Rosin-maleic anhydride addition product;
Coumaronecarboxylic acid;
Quinolinecarboxylic acid;
Quinolinedicarboxylic acid;
2-Hydroxydibenzofuran-3-carboxylic acid;
2-Hydroxycarbazole-3-carboxylic acid; and etc.

By the introduction of a cyclic group of a large carbon number in the phosphoric ester compound as described above, it is possible to impart hydrophobicity or lipophilicity to the phosphoric ester compound and at the same time to increase its compatibility with pigments, especially, organic pigments significantly.

When a pigment is treated with such a phosphoric ester compound, the phosphoric ester compound renders the surface of the pigment very hydrophobic or lipophilic. As a result, it is possible to improve the compatibility of the thus-treated pigment with oil media substantially.

The phosphoric ester compound useful as a dispersant in this invention is obtained by reacting 3-1 mole of a hydroxyl-terminated polyester compound, such as that mentioned above, with 1 mole of the above-described ester-forming phosphorus compound. When the above hydroxyl-terminated polyester compound is reacted in a proportion of 1 mole or 2 moles per mole of the phosphorus compound, the remaining one or two Rs other than the group of the polyester chain in the general formula may preferably be a group other than the above polyester residuum, for example, a residuum of another alcohol compound, hydrogen atom, inorganic cation or organic cation.

As exemplary inorganic cations, may be mentioned cations of alkali metals such as sodium and potassium, multivalent metals having a valency of 2 or more such as magnesium, calcium, strontium, barium, manganese, iron, cobalt, nickel, zinc, aluminum and tin, ammonium, etc. Illustrative examples of organic cations may include cations of primary, secondary and tertiary mono- and polyamines having 1-30 carbon atoms, such as methyl-, ethyl-, propyl-, butyl-, hexyl-, octyl-, dodecyl-, octadecyl-, oleyl-, diethyl-, dibutyl-, distearyl-, triethyl-, tributyl, dimethyloctyl-, dimethyldecyl-, dimethyldodecyl-, dimethyltetradecyl-, dimethylhexadecyl-, dimethyloctadecyl-, dimethyloleyl-, dilaurylmonomethyl- and trioctyl-amines, dimethylaniline, ethylenediamine, propylenediamine, hexamethylenediamine, and stearylpropylenediamine; quaternary ammonium salts such as octadecyltrimethylammonium and dioctadecyldimethylammonium; ethanolamine, diethanolamine, triethanolamine, dimethylethanolamine, diethylethanolamine, propanolamine, dipropanolamine, and alkanolamines obtained by adding ethylene oxide to the foregoing higher aliphatic amines; etc.

When a higher aliphatic amine obtained from a natural oil or fat or its ammonium salt is used, admixed amines having different carbon numbers or saturation degrees due to the use of the natural oil or fat as a raw material may also be used together.

Among the above-mentioned phosphoric ester compounds useful in the present invention, phosphoric ester compounds in each of which the three Rs are individually a residuum of a hydroxyl-terminated polyester compound, phosphoric ester compounds in each of which group or groups other than a residuum of a hydroxyl-terminated polyester compound are each a residuum of another alcohol, and phosphoric ester compounds in each of which one or two of the three Rs are each a cation of a higher amine are relatively hydrophobic dispersants and can be as used suitably as solutions in organic solvents.

Compounds of the above general formula, in which one or two Rs out of the three Rs are each a cation of an alkali metal, ammonium, lower amine or lower alkanolamine, are dispersants having relatively high hydrophilicity and can be used suitably as dispersants in aqueous solutions or aqueous dispersions.

Any conventionally-known pigments may be used in the present invention, including organic pigments, inorganic pigments, extender pigments, etc.

For example, illustrative examples of organic pigments may include phthalocyanine pigments, azo pigments, condensed azo pigments, anthraquinone pigments, perinone/perylene pigments, indigo/thioindigo pigments, isoindolinone pigments, azomethineazo pigments, dioxazine pigments, quinacridone pigments, aniline black pigments, triphenylmethane pigments, carbon black and the like. As exemplary inorganic pigments, may be mentioned titanium oxide pigments, iron oxide pigments, iron hydroxide pigments, chromium oxide pigments, calcined spinel pigments, lead chromate pigments, chromium vermillion pigments, iron blue pigments, aluminum powder, bronze powder, etc. As extender pigments, may be mentioned calcium carbonate pigments, barium sulfate pigments, silicon oxide pigments and aluminum hydroxide pigments by way of example.

In the present invention, these pigments may be used in the form of aqueous filter cakes or aqueous suspensions, in addition to dried fine powdery forms.

The pigment composition of this invention can be obtained by incorporating such a phosphoric ester compound as described above in a proportion of about 1-300 parts by weight, preferably, about 3-about 150 parts by weight based on 100 parts by weight of such a pigment as described above. Needless to say, it is also possible to add a conventionally-known suitable organic solvent, binder resin such as vehicle for oil-based paints, varnish for oil-based printing inks or vehicle for oil-based coating formulations, thermoplastic resin, thermosetting resin, plasticizer, crosslinking agent, catalyst and/or the like concurrently upon mixing these two components, thereby obtaining a paint, printing ink or the like directly.

Any conventionally-known method may be used to mix these essential and optional components and to obtain the pigment composition of this invention. It is a typical method to mix, knead and comminute them, for example, in a conventionally-known disperser such as ball mill, sand mill, attritor, horizontal continuous medium disperser, two-roll mill, three-roll mill, pressurized kneader, Banbury mixer or extruder.

When the pigment is used in the form of an aqueous filter cake or aqueous suspension in particular, the dispersant useful in the practice of this invention is added to and mixed (flushed) with the pigment either singly or preferably in the form of a solution in a hydrophobic organic solvent (which may optionally contain a binder for printing inks or paints), whereby the pigment is caused to transfer from the aqueous phase to the organic solvent phase so as to obtain a pigment composition of this invention.

The pigment composition of this invention may take the following forms:

(1) A composition containing a pigment at a high concentration, which is useful as a colorant for printing inks, paints, coating formulations, synthetic resins, etc. In this form, the concentration of the pigment ranges from 20% to 95%, while the concentration of the dispersant useful in the practice of this invention is 1–300 wt.% based on the pigment.

(2) A composition which contains a solvent, binder resin and the like, which are required to formulate paints, dispersants and coating formulations, and is useful as paints and the like. In this composition, the pigment concentration is 0.1–20 wt.% and the dispersant concentration ranges from 1 to 300 wt.% of the pigment.

Paints making use of conventionally-known pigments are all included, for example, automotive paints, construction paints, wood paints, vehicle and equipment paints, household paints, plastic-coating paints, paints for precoated metals, can paints, ship paints, corrosion-resistant paints, photo-setting paints, electron radiation curing paints, electrostatic powder coating paints, vinyl sols, etc.

On the other hand, conventionally-known printing inks are all included, for example, letterpress inks, lithographic inks, intaglio gravure inks, screen printing inks, news inks, flexographic inks, etc.

Pigment compositions in such various forms as described above may be either solid or liquid. In liquid forms, water, mixed solvents of water and hydrophilic organic solvents and organic solvents are used as media. As exemplary organic solvents, may be used aliphatic solvents, alicyclic solvents, aromatic hydrocarbons, halogenated hydrocarbons, esters, ketones, glycol ethers, alcohols, etc. No particular limitation is imposed.

As vehicles for paints, varnishes for printing inks, vehicles for coating formulations and the like, conventionally-known oily or aqueous binders may be used depending on individual applications, for example, including, e.g., long, medium and short oil length alkyd resins, modified alkyd resins such as phenol-modified alkyd resins and styrenated alkyd resins, aminoalkyd resins, oil-free alkyd resins, baking acrylic resins, acrylic lacquer resins, acrylic polyol resins, polyester resins, epoxy resins, butylated melamine resins, methylated melamine resins, ureamelamine resins, phenol resins, rosin-modified phenol resins, rosin-modified maleic acid resins, phenol-modified maleic acid resins, polyurethane resins, styrene resins, styrene-acrylic resins, styrene-diene copolymers, vinyl chloride copolymers, vinyl acetate resins, vinyl acetate copolymers, ethylene-vinyl acetate resins, butyral resins, petroleum resins, modified resins such as rosin esters and maleinized rosin esters, drying oils and blown oils.

Illustrative examples of thermoplastic resins may include polyvinyl chloride resin, styrene resin, acrylonitrile-styrene resins, acrylic resins, methacrylic-styrene resins and polyester resins.

As exemplary plasticizers, may be mentioned phthalic esters, adipic esters, sebacic esters, polyester plasticizers, epoxylated soybean oil, etc.

The attainment of this invention will not be impeded by the use of a conventionally-known dispersant or flushing agent for pigments as needed, for example, by the combined use of a higher aliphatic primary, secondary or tertiary monoamine, a higher aliphatic quaternary ammonium or a higher aliphatic propylene diamine or the acetic acid or a higher fatty acid salt thereof.

The present invention will next be described specifically by the following Referential Examples (Preparation Examples of Phosphoric Ester Compounds) and Examples, in which all designations of "part" or "parts" and "%" are by weight unless otherwise specifically indicated.

REFERENTIAL EXAMPLE 1

(1) Synthesis of Polyester

Provided were a glass-made 4-neck reactor, which had a stirrer, a thermometer, a reflux condenser fitted with a moisture distilling tube and a charging port, and an oil bath. The reactor was then charged with 534 parts of "Methyl Nadic Anhydride", 270 parts of butylene glycol, 246 parts of ethyleneglycol mono(2-naphthoxyacetate) and 350 parts of toluene. The contents were stirred into a solution. After the dissolution, the resultant solution was heated and 15.8 parts of p-toluenesulfonic acid was added as a condensation catalyst. The reaction mixture was heated to 120° C., at which a polyesterification reaction was allowed to proceed. The progress of the reaction was monitored by amounts of water distilled and infrared absorption spectra of the reaction mixture. Seven hours later, the reaction mixture was cooled to terminate the reaction.

The catalyst was then neutralized with an alkali, toluene was distilled off and methanol was added to extract and wash the thus-neutralized catalyst. The methanol was distilled off.

The thus-obtained reaction product was a liquid of an amber color. By an infrared absorption spectrum and an analysis chart of gel permeation chromatography, the reaction product was found to contain as its principal component an ester of a Methyl Nadic Acidbutylene glycol polyester with ethyleneglycol mono(2-naphthoxyacetate). One gram equivalent of the resultant polyester was found to be about 1,000 from measurement results of the hydroxyl value of the reaction product.

(2) Synthetic reactions of phosphoric ester compounds:

Provided were a glass-made four-neck reactor, which was equipped with a stirrer, a thermometer, a dropping funnel and a reflux condenser, and a water bath.

In the reactor, 293.5 parts of the polyester obtained in the above procedure (1), 293.5 parts of benzene and 35.6 parts of triethylamine were charged, mixed and dissolved. Separately, 15.0 parts of phosphorus oxychloride were charged in the dropping funnel and the dropping funnel was then fitted on the reactor.

The equivalent ratio of the polyester obtained in the above procedure (1), phosphorus oxychloride and triethylamine was 3:3:3.6.

While paying attention not to allow the temperature of the reaction mixture to rise beyond 10° C. by cooling it under stirring, the phosphorus oxychloride was added dropwise over 60 minutes from the dropping funnel. After completion of the dropwise addition, the reaction mixture was slowly heated to 80° C. in the course of 2 hours. The contents were reacted under stirring for 2 hours, followed by cooling, Thereafter, the reaction mixture was washed with methanol in order to remove triethylamine, its salts and the like from the reaction mixture. The methanol was distilled off, thereby obtaining the reaction product in a brown liquid form. From an infrared spectrum and an analysis chart of gel permeation chromatograph, the reaction product was found to be the phosphoric triester of the ethyleneglycol mono(2-naphtoxyacetate) of a Methyl Nadic Acid-butyleneglycol polyester. The approximate average molecular weight of the principal component of the phosphoric ester was 2,700–3,000 (Dispersant 1).

REFERENTIAL EXAMPLES 2–13

Using materials described below in the respective Referential Examples in place of the materials of the procedure (2) of Referential Example 1, various phosphoric ester compounds were obtained in the same manner as in the procedure (2) of Referential Example 1.

REFERENTIAL EXAMPLE 2

|  | Equivalents |
| --- | --- |
| Methyl Nadic Anhydride-hexahydrophthalic anhydride-butylene glycol-ethylene glycol-naphthyl-1-acetic acid (2:1:3:1:1) polyester (1 gram equivalent = 940) | 3 |
| Phosphorus oxychloride | 3 |

Average molecular weight of the principal component of the reaction product (Dispersant 2): 2,600–2,900.

REFERENTIAL EXAMPLE 3

|  | Equivalents |
| --- | --- |
| Methyl Nadic Anhydride-phthalic anhydride-butylene glycol-tetraethylene glycol-2-naphthyl ether (2:1:3:1) polyester (1 gram equivalent = 1,040) | 3 |
| Phosphorus oxychloride | 3 |

Average molecular weight of the principal component of the reaction product (Dispersant 3): 2,800–3,200.

REFERENTIAL EXAMPLE 4

|  | Equivalents |
| --- | --- |
| Methyl Nadic Anhydride-butylene glycol-12-hydroxystearic acid-diethylene glycol-2-naphthyl ether (1:1:2:1) polyester (1 gram equivalent = 1,050) | 3 |
| Phosphorus oxychloride | 3 |

Average molecular weight of the principal component of the reaction product (Dispersant 4): 2,800–3,200.

REFERENTIAL EXAMPLE 5

|  | Equivalents |
| --- | --- |
| Methyl Nadic Anhydride-butylene glycol-dipropylene glycol-2-naphthyl ether (2:2:1) polyester (1 gram equivalent = 760) | 3 |
| Phosphorus oxychloride | 3 |

Average molecular weight of the principal component of the reaction product (Dispersant 5): 2,100–2,300.

REFERENTIAL EXAMPLE 6

|  | Equivalents |
| --- | --- |
| Methyl Nadic Anhydride-butylene glycol-12-hydroxystearic acid-cyclohexyl alcohol (1:1:2:1) polyester (1 gram equivalent = 920) | 3 |
| Phosphorus oxychloride | 3 |

Average molecular weight of the principal component of the reaction product (Dispersant 6): 2,500–2,800.

REFERENTIAL EXAMPLE 7

|  | Equivalents |
| --- | --- |
| Methyl Nadic Anhydride-phthalic anhydride-butylene glycol-benzyl alcohol (2:1:3:1) polyester (1 gram equivalent = 830) | 3 |
| Phosphorus oxychloride | 3 |

Average molecular weight of the principal component of the reaction product (Dispersant 7): 2,200–2,500.

REFERENTIAL EXAMPLE 8

|  | Equivalents |
| --- | --- |
| Methyl Nadic Anhydride-butylene glycol-cyclohexyl alcohol (3:3:1) polyester (1 gram equivalent = 850) | 2 |
| Diethylene glycol-2-naphthyl ether (1 gram equivalent = 230) | 1 |
| Phosphorus oxychloride | 3 |

Average molecular weight of the principal component of the reaction product (Dispersant 8): 1,800–2,000.

REFERENTIAL EXAMPLE 9

|  | Equivalents |
| --- | --- |
| Methyl Nadic Anhydride-butylene glycol-benzyl alcohol (3:3:1) polyester (1 gram equivalent = 860) | 2 |
| Diethylene glycol-2-naphthyl ether (1 gram equivalent = 230) | 1 |

-continued

| | Equivalents |
|---|---|
| Phosphorus oxychloride | 3 |

Average molecular weight of the principal component of the reaction product (Dispersant 9): 1,800–2,000.

REFERENTIAL EXAMPLE 10

| | Equivalents |
|---|---|
| Methyl Nadic Anhydride-butylene glycol-benzyl alcohol (3:3:1) polyester (1 gram equivalent = 860) | 2 |
| Phosphorus oxychloride | 3 |

(After the reaction, the reaction product was neutralized with distearyldimethylamine into its salt.)

Average molecular weight of the principal component of the reaction product (Dispersant 10): 1,600–1,800.

REFERENTIAL EXAMPLE 11

| | Equivalents |
|---|---|
| Methyl Nadic Anhydride-butylene glycol-dipropylene glycol-2-naphthyl ether (2:2:1) polyester (1 gram equivalent = 760) | 2 |
| Phosphorus oxychloride | 3 |

(After the reaction, the reaction product was neutralized with distearyldimethylamine into its salt.)

Average molecular weight of the principal component of the reaction product (Dispersant 11): 1,400–1,600.

REFERENTIAL EXAMPLE 12

| | Equivalents |
|---|---|
| Methyl Nadic Anhydride-butylene glycol (1:1) polyester (1 gram equivalent = 450) | 1 |
| Diethylene glycol-2-naphthyl ether (1 gram equivalent: 230) | 1 |
| Phosphorus oxychloride | 3 |

(After the reaction, the reaction product was neutralized with distearyldimethylamine into its salt.)

Average molecular weight of the principal component of the reaction product (Dispersant 12): 600–750.

REFERENTIAL EXAMPLE 13

| | Equivalents |
|---|---|
| Methyl Nadic Anhydride-butylene glycol (1:1) polyester (1 gram equivalent = 1,020) | 1 |
| Phosphorus oxychloride | 3 |

(After the reaction, the reaction product was neutralized with trioctylamine into its salt.)

Average molecular weight of the principal component of the reaction product (Dispersant 13): 1,000–1,100.

EXAMPLE 1

Charged in a flusher were 238 parts of an aqueous filter cake (pigment content: 42%) of Copper phthalocyanine blue pigment (C.I. Pigment Blue 15-3), followed by an addition of a solution of 20 parts of Dispersant 1 obtained in Referential Example 1 in 58.5 parts of petroleum ink solvent to the flusher. The resultant mixture was kneaded by a method known per se in the art to effect flushing. In that flushing, water was released readily from the cake and Copper phthalocyanine pigment was allowed move into an oil phase of the dispersant.

Water was then removed completely to obtain a flushed color which contained Copper phthalocyanine blue pigment. An offset ink was prepared using the above-obtained flushed color which contained Copper phthalocyanine blue pigment.

| | Parts |
|---|---|
| Flushed color (pigment content: 56%) of Copper phthalocyanine blue pigment, obtained above | 34.8 |
| Mixed varnish for offset lithographic inks | 63.0 |
| 5% Cobalt drier | 0.2 |
| 8% Manganese drier | 1.0 |
| Ink solvent | 1.0 |
| TOTAL | 100.0 |

In the above formulation, the mixed varnish for offset inks had the following composition.

| | Parts |
|---|---|
| Rosin-modified phenol resin | 35 |
| Drying oil | 25 |
| Drying oil modified isophthalic acid alkyd | 10 |
| Ink solvent | 29.5 |
| Aluminum chelate | 0.5 |
| TOTAL | 100.0 |

Uncoated printing paper sheets were printed with the above-obtained ink by an offset press, thereby obtaining prints of a vivid cyan color.

Following the above-described procedure, additional flushed colors were also prepared using an aqueous filter cake (pigment content: 27%) of Disazo yellow pigment (C.I. Pigment Yellow 12) and an aqueous filter cake (pigment content: 25%) of Brilliant carmine 6B pigment (C.I. Pigment Red 57-1) separately, followed by their formulation into offset inks of yellow and magenta colors.

Similarly, a further flushed color was obtained from an aqueous filter cake of Lake red C pigment (C.I. Pigment Red 53-1), followed by its formulation into an offset ink of a bronze red color. In addition, a still further flushed color was obtained from an aqueous filter cake of Copper phthalocyanine green pigment (C.I. Pigment Green 7), followed by its formulation into an offset ink of a green color.

In each of the above flushing operations, the separation of water was easy and efficient movement of the pigment was observed. The formulation of the inks was easy. By offset lithographic printing with these inks, vivid prints of excellent quality were obtained.

The above procedures was repeated using Dispersant 2–Dispersant 13 separately in lieu of Dispersant 1. Similar excellent effects were also observed.

EXAMPLE 2

|  | Parts |
|---|---|
| Carbon black pigment | 20 |
| Dispersant 1 | 10 |
| Mixed varnish for offset lithographic ink | 65 |
| TOTAL | 95 |

In the three-roll mill, carbon black pigment was kneaded and dispersed in accordance with the above-described composition. The carbon black pigment was dispersed very well in the varnish.

|  | Parts |
|---|---|
| Varnish dispersion of carbon black pigment, obtained above | 95 |
| 5% Cobalt drier | 0.2 |
| 8% Manganese drier | 1.0 |
| Ink solvent | 3.8 |
| TOTAL | 100.0 |

The above components were mixed and kneaded homogeneously to obtain a carbon black ink. Printing was performed with the carbon black ink by an offset press to obtain prints of a black color having a high blackness. The above procedure was repeated using Dispersant 2–Dispersant 13 separately in lieu of Dispersant 1. Similar excellent effects were also observed.

Using the yellow ink, magenta ink and cyan inks obtained in Example 1 together with the jet black ink obtained above as offset lithographic process inks of yellow, magenta, cyan and black colors, four-color process printing was performed. Vivid and beautiful multicolor prints were obtained.

EXAMPLE 3

|  | Parts |
|---|---|
| Flushed color (pigment content: 56%) of Copper phthalocyanine blue pigment, obtained in Example 1 | 9.6 |
| Rutile-type titanium white | 2.0 |
| Rapid-drying styrenated alkyd resin | 72.6 |
| Xylol | 6.6 |
| Mineral spirit | 8.8 |
| 6% Cobalt naphthenate | 0.3 |
| Anti-skinning agent | 0.1 |
| TOTAL | 100.0 |

The above components were thoroughly mixed and dispersed to obtain a room-temperature curable rapid-drying enamel of a blue color for metal materials such as machines and vehicles. Upon application of the enamel, vivid and beautiful coating was performed.

Flushing was conducted in the same manner as in Example 1, using Dispersant2–Dispersant 13 separately in lieu of Dispersant 1 employed in Example 1. Flushed colors making use of the respective dispersants were obtained. Using aqueous filter cakes of pigments of Disazo yellow (C.I. Pigment Yellow 14), a fast yellow pigment obtained by diazotizing 4-aminophthalimide and then coupling the reaction product with acetoanilide, Watchung red (C.I. Pigment Red 48) and Carmine FB (C.I. Pigment Red 3)instead of Copper phthalocyanine blue pigment of Example 1, flushing operations were separately carried out in the same manner as in Example 1 to obtain flushed colors of the respective pigments.

The flushed colors were separately used in place of copper phthalocyanine pigment in the above paint composition, thereby obtaining paints of the respective colors. Vivid and beautiful coated plates were obtained.

EXAMPLE 4

|  | Parts |
|---|---|
| Dry ground pigment of Copper phthalocyanine blue pigment (C.I. Pigment Blue 15-3) | 10 |
| Dispersant 1 | 2 |
| Xylol | 13 |
| Butanol | 5 |
| TOTAL | 30 |

The above components were dispersed in a continuous horizontal medium disperser to obtain a dispersion of Copper phthalocyanine blue pigment in a xylol-butanol mixed solvent.

A paint was then formulated in accordance with the following composition.

|  | Parts |
|---|---|
| Solvent dispersion of Copper phthalocyanine blue and the phosphoric ester compound, obtained above | 3 |
| Rutile-type titanium white | 14 |
| Thermoplastic acrylic resin | 70 |
| Toluol | 6.8 |
| Xylol | 3.2 |
| Butanol | 2.2 |
| Cellosolve | 0.8 |
| TOTAL | 100.0 |

The above formulation was applied as an automotive acrylic lacquer enamel, thereby obtaining vivid and beautiful coating.

Similar excellent paints were also obtained from the separate use of Dispersant 2–Dispersant 13 in lieu of Dispersant 1.

We claim:

1. A pigment composition containing a pigment and a dispersant, characterized in that said dispersant is a wax paste or liquid phosphoric ester compound represented by the following general formula:

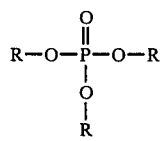

wherein at least one of the three Rs is a residuum of a polyester chain containing as principal bonds thereof ester bonds of a polycarboxylic acid and a polyalcohol.

2. The pigment composition as claimed in claim 1, wherein said polyesterchain contains a residuum selected from aliphatic hydrocarbon groups having 4-30 carbon atoms, alicyclic hydrocarbon groups, aromatic hydrocarbon groups and residua of heterocyclic compounds.

3. The pigment composition as claimed in claim 1, wherein two or one of the three Rs in the general formula is a residuum of a polyester chain containing as principal bonds thereof ester bonds of a polycarboxylic acid and a polyalcohol, and the remaining one or two Rs are each a group selected from residua of hydroxycarboxylic acids and alcohol esters thereof, hydrocarbon groups, a hydrogen atom and cations.

* * * * *